United States Patent
Dickens et al.

(10) Patent No.: US 9,207,351 B2
(45) Date of Patent: Dec. 8, 2015

(54) CONSTRUCTING RESISTIVITY MODELS FROM STOCHASTIC INVERSION

(75) Inventors: Thomas A. Dickens, Houston, TX (US); Dennis E. Willen, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 662 days.

(21) Appl. No.: 13/265,393

(22) PCT Filed: Mar. 26, 2010

(86) PCT No.: PCT/US2010/028870
§ 371 (c)(1),
(2), (4) Date: Oct. 20, 2011

(87) PCT Pub. No.: WO2010/151354
PCT Pub. Date: Dec. 29, 2010

(65) Prior Publication Data
US 2012/0080197 A1      Apr. 5, 2012

Related U.S. Application Data

(60) Provisional application No. 61/220,819, filed on Jun. 26, 2009.

(51) Int. Cl.
*G01V 3/12* (2006.01)
*G01V 3/08* (2006.01)
*G01V 99/00* (2009.01)

(52) U.S. Cl.
CPC ...... *G01V 3/12* (2013.01); *G01V 3/083* (2013.01); *G01V 99/00* (2013.01)

(58) Field of Classification Search
CPC ....... G01V 3/083; G01V 3/12; G01V 99/005; G01V 11/00; G01V 2210/665; G01V 2210/66; G01V 2210/6652

USPC ............ 702/1, 2, 14, 18; 367/14, 73; 703/10; 33/1 HH

See application file for complete search history.

(56) References Cited

U.S. PATENT DOCUMENTS 5,798,982 A    8/1998  He et al.
5,838,634 A    11/1998  Jones et al.
(Continued)

FOREIGN PATENT DOCUMENTS

EP         864882       7/2003
WO     WO 00/19240      4/2000
(Continued)

OTHER PUBLICATIONS

Commer, M et al. "Massively-Parallel Electrical-Conductivity Imaging of Hydrocarbons Using the Blue Gene/L Supercomputer", 2008, Lawrence Berkeley National Laboratory.*

(Continued)

*Primary Examiner* — Manuel L Barbee
(74) *Attorney, Agent, or Firm* — ExxonMobil Upstream Research Company

(57) ABSTRACT

Embodiments described herein use stochastic inversion (460) in lower dimensions to form an initial model (458) that is to be used in higher-dimensional gradient-based inversion (466). For example, an initial model may be formed from 1.5-D stochastic inversions, which is then processed (464) to form a 3-D model. Stochastic inversions reduce or avoid local minima and may provide an initial result that is near the global minimum.

35 Claims, 9 Drawing Sheets

(56) References Cited

U.S. PATENT DOCUMENTS

| | | | |
|---|---|---|---|
| 5,870,690 | A | 2/1999 | Frenkel et al. |
| 6,058,073 | A | 5/2000 | VerWest |
| 6,067,340 | A | 5/2000 | Eppstein et al. |
| 6,278,948 | B1 | 8/2001 | Jorgensen et al. |
| 6,817,218 | B1 | 11/2004 | Kelly et al. |
| 6,871,146 | B1 | 3/2005 | Kelly et al. |
| 6,901,333 | B2 | 5/2005 | Van Riel et al. |
| 6,970,397 | B2 | 11/2005 | Castagna et al. |
| 7,082,368 | B2 | 7/2006 | Nickel |
| 7,254,091 | B1* | 8/2007 | Gunning et al. ........ 367/73 |
| 7,366,616 | B2 | 4/2008 | Bennett |
| 7,373,251 | B2 | 5/2008 | Hamman et al. |
| 7,373,252 | B2 | 5/2008 | Sherrill et al. |
| 7,525,873 | B1 | 4/2009 | Bush et al. |
| 7,673,682 | B2 | 3/2010 | Daily |
| 7,706,981 | B2 | 4/2010 | Wilkinson et al. |
| 2003/0193837 | A1 | 10/2003 | Rommel |
| 2005/0033518 | A1 | 2/2005 | Jenner |
| 2006/0256657 | A1 | 11/2006 | Robinson |
| 2007/0005253 | A1 | 1/2007 | Fornel et al. |
| 2008/0103700 | A1 | 5/2008 | Van Den Berg et al. |
| 2008/0294387 | A1 | 11/2008 | Anderson et al. |
| 2009/0006053 | A1 | 1/2009 | Carazzone et al. |
| 2009/0010104 | A1 | 1/2009 | Leaney |
| 2009/0070042 | A1 | 3/2009 | Birchwood et al. |
| 2009/0093965 | A1 | 4/2009 | Godfrey et al. |
| 2009/0164186 | A1 | 6/2009 | Haase et al. |
| 2009/0187391 | A1 | 7/2009 | Wendt et al. |
| 2010/0185422 | A1* | 7/2010 | Hoversten ........ 703/2 |

FOREIGN PATENT DOCUMENTS

| | | |
|---|---|---|
| WO | WO 2007/126481 | 11/2007 |
| WO | WO2008/154640 | 12/2008 |

OTHER PUBLICATIONS

Carazzone, J. J. et al. (2005), "Three Dimensional Imaging of Marine CSEM Data", Expanded Abstracts, 75th Annual International meeting, Society of Exploration Geophsycists, pp. 575-578.

Chen, J. et al. (2007), "Effects of uncertainty in rock-physics models on reservoir parameter estimation using marine seismic AVA and CSEM data", Abstracts of the $77^{th}$ Annual International Meeting, Society of Exploration Geophysicists, pp. 457-461.

Chen, J. et al. (2009), "Effects of Unvertainty in Rock-Physics Models on Reservoir Parameter Estimation Using Seismic Amplitude Variation with Angle and Controlled-Source Electromagnetic Data", Geophysical Prospecting 57, pp. 61-74.

Chen, J. et al. (2007), "A Bayesian model for gas saturation estimation using marine seismic AVA and CSEM data", Geophysics 72, pp. WA85-WA95.

Chundru, R. et al. (1997), "Hybrid optimization methods for geophysical inversion", Geophysics 62, pp. 1196-1207.

Commer, M. et al. (2008), "New advances in three-dimensional controlled-source electromagnetic inversion", Geophys. J. Int. 172, pp. 513-535.

Commer, M. et al. (2008), "Massively-Parallel Electrical-Conductivity Imaging of Hydrocarbons Using the Blue Gene/L Supercomputer", Lawrence Berkeley Nat'l. Laboratory, 32 pgs.

Constable, S. et al. (1987), "Occam's inversion: a practical algorithm for generating smooth models from electromagnetic sounding data", Geophysics 52, pp. 289-300.

Debeye, H.W.J. et al. (1997), "Stochastic Inversion", The Strategic Importance of Oil and Gas Technology Proceedings of the $5^{th}$ European Union Hydrocarbon Symposium, U.K. 1, pp. 166-175.

deGroot-Hedlin, C. et al. (1990), "Occam's inversion to generate smooth, two-dimensional models from magnetotelluric data", Geophysics 55, pp. 1613-1624.

Dennis, J.E. et al. (1983), "Numerical Methods for Unconstrained Optimization and Nonlinear Equations," Printice-Hall, Englewood Cliffs, NJ, ISBN-0-13-627216-9, pp. 220-229.

Eide, A.L. et al. (1996), "Stochastic Reservoir Characterization Conditioned on Seismic Data", Geophysics 69(4), pp. 824-836.

Ellingsrud, S. T. et al. (2002), "Remote sensing of hydrocarbon layers by seabed logging (SBL): Results from a cruise offshore Angola", The Leading Edg, 21, pp. 972-982.

Jing, C. et al. (2008), "CSEM inversion: impact of anisotropy, data coverage, and initial models", $78^{th}$ Annual International Meeting, Society of Exploration Geophysicists, Expanded Abstracts, pp. 604=6-9.

Jupp, D. et al. (1977), "Resolving anisotropy in layered media by joint inversion", Geophysical Prospecting 25, 460-470.

Kirkpatrick, S. et al. (1983), "Optimizations by simulated annealing", Science 220, pp. 671-680.

MacGregor, L. et al. (2007), "Derisking exploration prospects using integrated seismic and electromagnetic data—a Falkland Islands case study", The Leading Edge 26, pp. 356-359.

Newman, G. A. et al. (1997), "Three-dimensional massively parallel electromagnetic inversion—I. Theory", Geophys. J Int. 128, pp. 345-354.

Newman, G. A. et al. (2000), "Three-dimensional magnetotelluric inversion using non-linear conjugate gradients", Geophys. J. Int, 140, pp. 410-424.

Roy, L. et al. (2005), "Inversion and uncertainty estimation of gravity data using simulated annealing: An application over Lake Vostok, East Antarctica", Geophysics 70, pp. J1-J12.

Srnka, L. J. et al. (2006), "Remote reservoir resistivity mapping—an overview", The Leading Edge 25, pp. 972-975.

Stoffa, P. et al. (1991), "Nonlinear multiparameter optimization using genetic algorithms: Inversion of plane-wave seismograms", Geophysics 56, pp. 1794-1810.

Tarantola, A. (1987), "Inverse Problem Theory—Methods for data fitting and model parameter estimation", Chapter 4, Elsevier, pp. 187-244.

Tarantola, A. (1987), "Inverse Problem Theory—Methods for data fitting and model parameter estimation", Chapter 4, Elsevier, pp. 245-302.

White, L. et al. (2002), "Stochastic Fluid Modulus Inversion", Geophysics 67(6), pp. 1835-1843.

International Search Report and Written Opinion, dated May 25, 2010, PCT/US2010/028870.

\* cited by examiner

CONSTRUCTING RESISTIVITY MODELS FROM STOCHASTIC INVERSION

CROSS REFERENCE TO RELATED APPLICATION

This application is the National Stage of International Application No. PCT/US2010/028870, that published as WO 2010/151354, filed 26 Mar. 2010, which claims the benefit of U.S. Provisional Application No. 61/220,819, filed 26 Jun. 2009, each of which is incorporated herein by reference, in its entirety, for all purposes.

TECHNICAL FIELD

This application relates in general to geologic modeling and in specific to forming geologic resistivity or conductivity models using stochastic inversions.

BACKGROUND OF THE INVENTION

Controlled-source electromagnetic ("CSEM") surveys are a useful geophysical tool for evaluating the presence of hydrocarbon-bearing strata within the earth. CSEM surveys typically record the electromagnetic ("EM") signal induced in the earth by a source or transmitter, and measured at one or more receivers. The behavior of this signal as a function of transmitter location, frequency, and separation (or offset) between transmitter and receiver can be used to determine the properties of the rock, specifically whether hydrocarbons are present. One of the properties is electrical resistivity. Thus, CSEM measurements are typically used to determine the spatially varying resistivity of the subsurface region of interest.

CSEM surveys may be performed over land or water. In a water environment, CSEM data are typically acquired by towing an electric dipole transmitter antenna behind a vessel. The seafloor above the region of interest is populated with a plurality of receivers. The receivers typically have multiple sensors designed to record different vector components of the electric and/or magnetic fields. The receivers are placed on the seafloor at distances of two to three kilometers apart by the same vessel that tows the transmitter or by another vessel. The receivers are weighted, and thus sink to the seafloor. After placement, the vessel broadcasts a low frequency dipole signal through the transmitter. Typically, the signal ranges from ⅛ to 2 Hertz, but may be as low as 0.001 Hertz and as high as 10 Hertz. The low frequency allows signal penetration into subsurface regions below the seafloor. After the survey is completed, a command, e.g. an acoustic command, from the tow vessel or another vessel causes the receivers to release their weights, and thus to rise to the surface. The receivers, with their data, are then retrieved. To form the data, the transmitter antenna is typically towed a few tens of meters above the seafloor by the vessel on the sea surface. The antenna sends out a plurality of pulses, and each receiver records the values of the electric and/or magnetic fields in the region around the receiver.

Alternative configurations include stationary transmitters on the seafloor, or in the water column, as well as magnetic transmitter antennae and passive sources, such as magnetotelluric energy. Such energy may be generated, for example, by the interaction of the solar wind with the earth's magnetic field. The transmitting and receiving systems typically operate independently, meaning without any connection between them, thus the receiver data needs to be synchronized with shipboard measurements of transmitter position by comparing clock times on the receivers to time from a shipboard or GPS (Global Positioning System) standard.

The transmitted signal drives electrical current into the subsurface and the water column, resulting in an electromagnetic field throughout the subsurface and the water column, based on the laws of physics encapsulated, for example, in Maxwell's equations. The data collected by each of the receivers is essentially an expression of the amplitude and phase of the resulting electric and/or magnetic fields versus the distance between the receiver and the transmitter. The amplitudes peak when the transmitter is closest to the receiver and are smallest when the transmitter is far away from the receiver. The resulting electric and magnetic fields may vary depending upon whether the subsurface region includes conductive or resistive bodies. Conductive bodies may include, for example, brine-saturated sandstones or shales; whereas resistive bodies may include salt domes, basalt flows, limestones, or hydrocarbon-saturated reservoirs.

CSEM data is typically analyzed in the temporal frequency domain with each signal representing the response of the earth to electromagnetic energy at that temporal frequency. Temporal frequency domain means the data are transformed, typically by Fourier transformation, such that the dependence of the data on time becomes a dependence on frequency. In raw CSEM data, the strength of each frequency component varies depending on how much energy the transmitter broadcasts. That is, the strength depends upon the amplitude and phase of each component in the frequency spectrum of the transmitter, and also on the receiver sensitivity at that frequency. These transmitter and receiver effects are typically removed from the data prior to interpretation.

Note that the resistivity of the subsurface regions, such as the Earth, is generally anisotropic. Thus, the ratio of electric field to applied current depends both on the direction of the current and on the direction of the field. It is further recognized that the subsurface regions may be equivalently characterized by resistivity or its inverse, electrical conductivity. Areas that comprise brine-saturated rock have lower resistivities and higher conductivities than areas that may contain nonconductive materials, such as oil.

Frequency-domain inversion is commonly used to infer resistivity values from CSEM data. See, for example, Carazzone, J. J., et al., "Three Dimensional Imaging of Marine CSEM Data," Expanded Abstracts, 75$^{th}$ Annual Int'l Meeting, Society of Exploration Geophysicists, pp. 575-578, (2005); and MacGregor, L., et al., "Derisking Exploration Prospects Using Integrated Seismic and Electromagnetic Data—a Falkland Islands Case Study," The Leading Edge, 26, pp. 356-359, (2007). Inversion is useful because it produces resistivity models of the subsurface consistent with the measured data, specifically, with the amplitude and phase of one or more measured components of the electric and/or magnetic fields at one or more frequencies and receiver locations. Using Maxwell's equations, one-dimensional (1-D), two-dimensional (2-D), and three-dimensional (3-D) inversions of the data generate 1D resistivity profiles, 2D resistivity cross-sections, and 3D resistivity volumes, respectively. In some cases, it may be desirable to obtain and incorporate measurements of the CSEM magnetic fields as well as natural-source electromagnetic data, such as magnetotelluric data, in the inversion together with the CSEM data.

Linearized, iterative inversion of electromagnetic data is discussed, for example, in Commer, M., and Newman, G. A., "New Advances in Three-Dimensional Controlled-Source Electromagnetic Inversion," Geophys. J. Int., v. 172, pp. 513-535, (2008). This inversion process determines a single resistivity model that best fits the collected data, while simultaneously obeying a smoothness constraint and/or other constraints, such as a priori subsurface resistivity information. Beginning with an initial resistivity model the inversion process forward-simulates electromagnetic data corresponding to the source and receiver configurations in the actual survey. An objective function is then computed, which is a measure of the mismatch between the measured and synthetic data and of the quality of the constraint. If the objective function is sufficiently small, then the inversion process is complete and the resistivity model is accepted as an approximate representation of the actual resistivity of the subsurface region. More commonly, the resistivity model may be adjusted to reduce the objective function. In 2-D and 3-D inversions, the most practical technique is the use of a gradient-based method which determines a model adjustment that is orthogonal (in the space of model parameters) to the gradient of the objective function. (For a discussion of gradient-based methods see Dennis, J. E., Schnabel, R. B. "Numerical Methods for Unconstrained Optimization and Nonlinear Equations," Printice-Hall, Englewood Cliffs, N.J. (1983) (ISBN-0-13-627216-9). This model adjustment is applied to the resistivity model and the process is repeated, with new synthetic data being generated and a new model adjustment being determined. As the process is repeated (or iterated), the influence of the constraint term is commonly decreased, so that it does not overwhelm the mismatch between measured and synthetic data in the objective function. After a number of iterations, the objective function may either be sufficiently small or no model adjustment can be found that may further reduce the objective function. A resistivity model for which no adjustment can be found that further reduces the objective function is known as a "local minimum" to those practiced in the art of inversion.

An advantage of gradient-based inversion algorithms is that they are relatively computationally inexpensive. However, it is well known that such inversion methods do not typically find the optimal resistivity model. Electromagnetic inversion is a so-called ill-posed problem, which implies that there are in fact a multiplicity of resistivity models that are consistent with the measured electromagnetic data. Therefore, the results of the inversion process are not unique, but depend upon a number of factors, one of which is the initial resistivity model. The inversion process does not in general converge to the global minimum of the objective function but, rather, it converges to a local minimum lying near the location in model space occupied by the initial resistivity model, as discussed with reference to FIG. 1.

FIG. 1 depicts an example where an inversion process settles at a local minimum rather than at the global minimum. The graph 100 depicts a plot of misfit versus model parameter. The graph includes a plurality of local minima, at points 101a-101c, with one of the local minima being the global minimum point 101a. The global minimum point 101a represents the optimal (e.g., best or correct) model with the least data misfit. The vertical axis in the graph 100 represents the data misfit $X^2$, given by equation (1):

$$X^2 = \frac{1}{M} \sum_{i=1}^{N} \frac{(E_i^{data} - E_i^{mod})^2}{\theta_i^2}, \quad (1)$$

where E represents electric and/or magnetic field values and the sum is over frequencies, vector components and source-receiver separations, which are represented by index i. The labels 'data' and 'mod" refer to measured data and modeled data, respectively. The total number of data points is given by M, and the quantity $\theta_i$ is the measurement uncertainty of the ith data point. The equation (1) is a commonly used representation of data misfit. Please note that the measurement of uncertainty is typically represented by the symbol σ; however, we also typically use σ to represent conductivity, so for clarity we use the symbol θ to represent measurement uncertainty.

The inversion process minimizes an objective function that may include the data misfit $X^2$ alone, or the data misfit $X^2$ plus additional regularization term(s) designed to emphasize a certain characteristic of the model, such as its smoothness. In CSEM inversion, the model parameter being solved for is the subsurface conductivity, σ, which is the inverse of the resistivity. For example, in FIG. 1, the horizontal axis represents the value of the conductivity. For each frequency, electromagnetic field component, and source-receiver configuration, $E_i^{mod}$ is determined from the model comprised of the totality of the σ values by solving Maxwell's equations.

In the space of model parameters, gradient-based inversion methods determine a path that decreases the data misfit $X^2$. For example, given an initial model estimate 102, gradient inversion moves the model parameter along the path 106 toward the minimum 101c at which point the inversion process halts. As used herein, the "conjugate gradient method" is a method for finding the nearest local minimum (e.g., the smallest value of a set, function, etc., within some local neighborhood) of a function of n variables which presupposes that the gradient of the function can be computed. A gradient in 3-D is, for example, the vector sum of the partial derivatives with respect to the three-coordinate variables x, y, and z of a scalar quantity whose value varies from point to point. In resistivity inversion, the relevant gradient is the n-dimensional vector of derivatives of the objective function with respect to the model conductivities. The conjugate gradient method uses conjugate directions instead of the local gradient for approaching the local minimum. If the vicinity of the minimum has the shape of a long, narrow valley, the minimum is reached in far fewer steps than other methods, such as the method of steepest descent. Because the initial point 102 lies near a local minimum 101c and not the global minimum 101a, the process finds a solution at the local minimum 101c, and not at the global minimum 101a. However, if the initial estimate were chosen to be point 104, then the inversion process finds a solution at the global minimum 101a by traveling along path 107 during the iterations.

Several techniques are available for overcoming the problem of finding local minima instead of the more desirable global minimum. Collectively, these are known as "stochastic" inversions because they attempt to avoid becoming trapped in local minima by employing some randomness in their search patterns. A stochastic process is one whose behavior is non-deterministic in that a subsequent state is determined by the process's predictable actions and by a random element. Thus, stochastic inversion methods may become untrapped at local minimum 101b and may converge to the global minimum at 101a. One stochastic technique is crude Monte-Carlo forward modeling, which involves searching the entire model space, and thus may involve too much computer time for a 3-D problem.

Non-limiting examples of other stochastic techniques include genetic algorithms, simulated annealing, and Markov-Chain Monte-Carlo (MCMC) (which is a method utilizing importance sampling), which may be faster techniques for attempting to find the global minimum. First, the genetic algorithms involve either randomly changing the set of inversion parameters found at each iteration or merging the set with sets of parameters from another iteration to form the parameter set or genetic code for the next iteration. The randomization of the parameters enables the method to avoid local minima Second, the simulated annealing methods mimic the physical process of cooling. They typically start by allowing the parameter set to vary relatively widely in the initial iterations, and then gradually decrease the allowable parameter space as iterations continue. Thus, the parameters are not likely to settle onto a local minimum in the first stages of the iteration, and should eventually converge to the global minimum as the iterations proceed and the allowable parameter range decreases. Finally, the Markov-Chain Monte-Carlo methods combine a random search with a prescription for ensuring that the search explores the correct portion of parameter space. These methods are further described in Chen, J., and Dickens, T., "Effects of Uncertainty in Rock-Physics Models on Reservoir Parameter Estimation Using Marine Seismic AVA and CSEM Data," Abstracts of the 77$^{th}$ Annual Int'l Meeting, Society of Exploration Geophysicists, pp. 457-461, (2007); Chen, J., and Dickens, T., "Effects of Uncertainty in Rock-Physics Models on Reservoir Parameter Estimation Using Seismic Amplitude Variation with Angle and Controlled-source Electromagnetic Data," Geophysical Prospecting, 57, pp. 61-74, (2009); and Chen, J., et al., "A Bayesian Model for Gas Saturation Estimation Using Marine Seismic AVA and CSEM Data," Geophysics, 72, pp. WA85-WA95, (2007). The prototype of these methods is the Metropolis-Hastings algorithm, which makes a random update to some model parameter at each step, and then accepts or rejects the update according to a specified probability distribution. All updates that decrease the misfit are accepted, and a portion of the updates that increase the misfit are allowed, giving the method the ability to jump out of local minima. These are a few examples of stochastic techniques.

Regardless of the method, even with their increased efficiency, these stochastic techniques may be limited because they involve unacceptable computer time to be applicable to most problems in 3-D and many problems in 2-D. That is, a characteristic common to stochastic techniques is that they may require several thousand or even tens of thousands of forward data simulations and evaluations of the objective function for different underlying earth models. A related characteristic of stochastic methods is that they result in a distribution of possible earth models and a measure of the likelihood, or probability distribution, of each. As such, these techniques are computationally expensive.

An additional approach is to utilize a hybrid method. Hybrid methods combine stochastic techniques with deterministic methods. These methods typically interleave iterations of deterministic inversion with stochastic inversion in some fashion designed to restrict the randomness of the stochastic search by exploiting the guaranteed decrease in the objective function from deterministic methods. However, similar to the stochastic techniques, these inversion methods are typically computationally expensive compared to direct inversion algorithms, which attempt to find a minimum in parameter space in as few steps as possible.

Direct, deterministic inversion algorithms include the simplex, steepest descent, conjugate gradient, quasi-Newton, Gauss-Newton, and full Newton techniques. Each of these algorithms performs only a few modeling steps to determine the location of the next parameter set in model space. Typically, these algorithms are designed to find the inversion result using the smallest possible number of forward modeling steps. Each algorithm bases its iterations on local information, so each is guaranteed only to find a local minimum in the solution space. In contrast to stochastic methods, gradient techniques typically only use a few tens or perhaps up to one hundred forward simulations from different underlying earth models. Note that typically the high cost of forward modeling in 2-D and 3-D, plus the increase in the number of parameters required to describe the model, cause stochastic inversion to be infeasible for such problems.

The degree to which 2-D and 3-D problems are underdetermined, and therefore the number of incorrect local minima, is even larger than for the 1-D case. Most areas of interest for hydrocarbon exploration are of such complexity that a 1-D model does not adequately describe them. Accordingly, 2-D and primarily 3-D models are utilized to properly describe the area of interest. Because of the computational requirements mentioned above, inversion of field data is therefore limited to gradient-based methods, so the results depend significantly on which local minimum lies near the starting model.

With presently available algorithms and computers, the application of stochastic inversion techniques to find the optimal global minimum for such problems is not practical. This severely limits the usefulness of inversion for making business decisions. If the inversion produces a result corresponding to a local minimum lying far from the global minimum, the predicted rock properties and/or structural framework may be so inaccurate as to cause the analyst to rely upon or infer inaccurate interpretations from the data. Regardless, even if the global minimum is found, its validity may be called into question, as it does not provably lie at the global minimum.

As stated earlier, one aspect of inversion techniques is that they involve an initial estimate of the earth resistivity model (e.g., a starting model or initial model). The creation of a good starting model is particularly challenging for 3-D models, because large model data sets are manipulated and populated with anisotropic resistivities, while maintaining enough consistency with the large volume of measured data and with other geophysical data to minimize errors and artifacts in the final inverted result. The inversion result is highly dependent upon the starting model used. As such, the 3-D CSEM inversion problem is typically ill-posed because different starting models may lead to different results. Furthermore, the use of a non-optimal starting model can lead to the presence of nonphysical artifacts whose sources may be difficult to identify.

One widely used technique for producing starting models for inversion processes is to make a simplifying assumption that allows the analyst to create a reasonable model. For example, velocity or resistivity models are often initialized by using information from a well, which is then extrapolated through the remainder of the model assuming that velocities or resistivities follow the same compaction trend starting at the water bottom. Similarly, anisotropy parameters may be extrapolated along the structural boundaries of a shale package. Thus, simplified models based on realistic geological assumptions may be useful to cure the deficiencies of nonoptimal starting models.

In other cases, a local layer cake or one and half-dimensional (1.5-D) model may be assumed at each data collection location. The data is analyzed at each location to determine the 1.5-D model that optimally fits the data. These 1.5-D models are then interpolated/extrapolated to produce a 3-D model that incorporates the information available near data-collection locations. For example, see Wahrmund, Leslie A., et al., "Method for Obtaining Resistivity from Controlled Source Electromagnetic Data," U.S. patent application Ser. No. 12/280,330 filed Aug. 21, 2008 from PCT Application PCT/US2007/004111, Published on Nov. 8, 2007. The terms "1.5-D" and "2.5-D" are commonly used by those familiar with geophysical and processing and inversion methods, and refer to earth models that, while encompassing three spatial dimensions, are described by properties that vary only in depth, or in depth and in one lateral dimension, respectively.

In addition to resistivity information obtained by inverting the electromagnetic data, other types of data may be used to help constrain the resistivity model. Well log data may be used to populate the model near a given well. If seismic reflection data are available for the location, the seismically identified reflectors can be used to correlate the resistivity data between well locations. Information on lithology and velocity gleaned from the seismic data can be used to loosely constrain the initial resistivity values. Again, if there are both well resistivity data and seismic velocities, these can be correlated and used to populate the resistivity model away from the well.

Alternatively, it is possible to use higher-dimensional information, such as a 2-D or 3-D seismic image and a rock-physics model that connects the seismic and electrical properties of the subsurface to initialize an approximate resistivity model in higher dimensions. See Chen, J., and Dickens, T. (2009). The rock-physics model may itself be calibrated by well log measurements or even replaced by a heuristic model based on well-log data.

The foregoing discussion of need in the art is intended to be representative rather than exhaustive. A technology addressing one or more such needs, or some other related shortcoming in the field, may be beneficial in developing geological models representative of subsurface regions and may facilitate prediction of a subsurface location for hydrocarbons based at least in part on such models.

Other related material may be found in the following publications: Eide et al., "Stochastic Reservoir Characterization Conditioned on Seismic Data," Geophysics, vol. 69, No. 4, pp. 824-836; Luther White et al., "Stochastic Fluid Modulus Inversion," Geophysics, vol. 67, No. 6, pp. 1835-1843, (November-December 2002); Debeye et al., "Stochastic Inversion", The Strategic Importance of Oil And Gas Technology Proceedings of the 5$^{th}$ European Union Hydrocarbon Syposium, Edinburgh, U.K., v. 1, pp. 166-175 (1997); U.S. Pat. Nos. 6,067,340, 6,278,948 and 6,970,397; and U.S. Patent App. Pub. No. 2009/0006053.

BRIEF SUMMARY OF THE INVENTION

Embodiments of the present techniques are directed to systems and methods which reduce errors in large 2-D or 3-D CSEM inversions caused by the presence of local minima in the objective function for such problems. Embodiments use 1-D or 2-D stochastic inversion methods to create the initial model that is to be used in the 2-D or 3-D gradient-based EM inversion. Stochastic inversion, which avoids local minima, is computationally feasible in 1-D or 2-D and can provide a starting or initial model for large 2-D or 3-D inversions that is potentially closer to the global minimum rather than to a local minimum. In addition, even if the initial model formed by combining stochastic 1-D or 2-D inversions does not lie in the immediate neighborhood of the global minimum (e.g. near the point labeled 101a in FIG. 1), the model is likely to be closer (in model space) to the true earth model than an initial model formed by combining gradient-based inversions, as is typically done at present.

One embodiment of the present techniques is a method of forming an N-dimensional model of a physical region. The method comprises sensing a physical property of at least a portion of the physical region that is transformed into data, and constructing an initial model of the physical region by performing a less than N-dimensional stochastic inversion on the data. The method includes performing an N-dimensional gradient based inversion on the initial model to form the N-dimensional model.

Another embodiment of the present techniques is a method of forming a 3-dimensional model of a physical region. This method comprises performing a controlled source electromagnetic survey of a portion of the physical region using a plurality of receivers located in the physical region to form a plurality of receiver data gathers, with one data gather associated with each receiver. The method includes performing a plurality of less than 3-dimensional stochastic inversions on the gathers, with one inversion being associated with a conductivity profile curve, to form a plurality of conductivity probability density functions, each density function being associated with the stochastic inversions of each gather The method also includes forming a plurality of less than 3-dimensional conductivity models using the probability density functions, with one conductivity model being formed from one function. The method further includes predicting at least one additional conductivity model, and populating an initial 3-dimensional model of the physical region with the one additional conductivity model and the plurality of less then 3-dimensional conductivity models. The method further includes performing a 3-dimensional gradient based inversion on the initial 3-dimensional model to form an updated 3-dimensional model.

A further embodiment of the present techniques is a computer program product having a computer readable medium having computer program logic recorded thereon for forming an N-dimensional model of a physical region. The computer program product comprises logic for constructing an initial model of the physical region by performing a less than N-dimensional stochastic inversion on data associated with the physical region, and logic to form the N-dimensional model.

The foregoing has outlined rather broadly the features and technical advantages of the present techniques in order that the detailed description of the present techniques that follows may be better understood. Additional features and advantages of the present techniques will be described hereinafter which form the subject of the claims of the present techniques. It should be appreciated by those skilled in the art that the conception and specific embodiment disclosed may be readily utilized as a basis for modifying or designing other structures for carrying out the same purposes of the present techniques. It should also be realized by those skilled in the art that such equivalent constructions do not depart from the spirit and scope of the present techniques as set forth in the appended claims. The novel features which are believed to be characteristic of the present techniques, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present techniques.

BRIEF DESCRIPTION OF THE DRAWINGS

For a more complete understanding of the present techniques, reference is now made to the following descriptions taken in conjunction with the accompanying drawings, in which.

DETAILED DESCRIPTION

Figure 1:
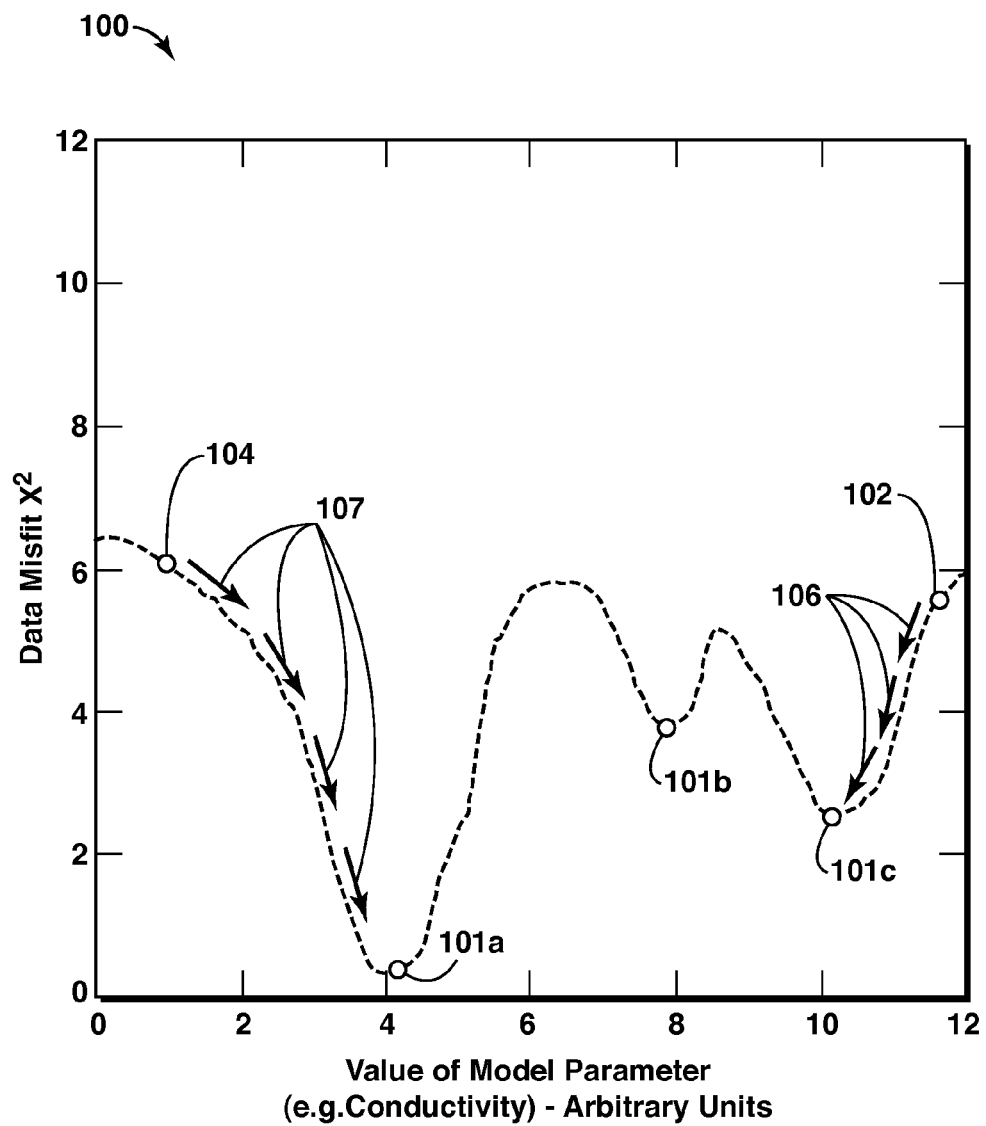
FIG. 1 depicts an example of plotted misfit, where the process settles at a local minimum rather than the global minimum.

As discussed previously, the presence of local minima in the solution space reduces the usefulness of a subsurface model created by inversion. The poor definition of the 3-D CSEM inverse model means that there are a number of solutions that may appear to fit the data almost equally well; however, these solutions may include multiple erroneous local minima and the correct global minimum. Avoiding the local minima to find the global minimum can be done by different techniques. For instance, one technique involves utilizing a stochastic inversion algorithm to ensure that the inversion process does not become trapped near a local minimum. A second technique involves starting the inversion process in the "zone of attraction" of the global minimum, so that convergence occurs at the global minimum. Because 3-D stochastic inversion involves significant computational resources one or more embodiments may utilize these techniques to start the inversion near the global minimum.

As used herein, a "model" refers to a computer-based representation of one or more physical properties throughout a subsurface earth volume, such as a petroleum reservoir or a depositional basin. Geologic models may take on many different forms. Depending on the context, descriptive or static geologic models built for petroleum applications can be represented in 1-D, 1.5-D, 2-D, 2.5D, 3D and the like. Some examples of earth material properties include conductivity, resistivity, or, in the case of an anisotropic earth, horizontal conductivity and vertical conductivity. Those skilled in the art of electromagnetic exploration may refer, without confusion, to anisotropic material properties as constituting one model or multiple models of the earth. Various geometrical descriptions are possible for one, two, or three-dimensional models. Some examples in three dimensions include uniform or non-uniform hexagonal cells, tetrahedral cells, or two-dimensional surfaces. In a cell-based description, the properties may be associated with either the volume of each cell or associated with the corner of each cell and include an interpolation rule for how the properties are to vary within a cell. In a description based on surfaces, the properties may be associated with the subsurface region above or below the surface. In two dimensions, models may be described by rectangular or triangular cells or perhaps by one-dimensional surfaces (curves). One-dimensional models are most naturally described by a set of depth values that bound regions of constant or linearly-varying material properties. Such depth values may vary uniformly or non-uniformly.

As discussed above, previous methods are not specifically designed to attempt to find an initial resistivity or conductivity model that is near the global minimum of the inversion problem. Instead, the prior methods combine the results of 1-D or 2-D gradient-based inversions, estimates from well log data, and estimates from seismically extracted parameters, such as velocity and lithology, to produce an initial model. However, as noted above, a model developed with these methods may not lie anywhere near the global minimum. For example, consider a 3-D model of a layer-cake structure. If we combine 1-D inversions of the layer cake structure, it yields a layered starting model because the results of the 1-D inversions have no lateral variation. However, the gradient-based 1-D inversions may have found local minima having nothing to do with the actual layer-cake resistivity structure, thus implying that the 3-D starting model lies directly atop the same local minimum in model space. Selection of a good starting model is necessary for accurate placement of subsurface features. Minor changes in the starting model may result in subsurface features changing depths by hundreds of meters.

One or more embodiments of the present techniques use information obtained from a low-dimensional (or less than N-dimensional) stochastic inversion computation to produce an initial or starting model for a high-dimensional (or N-dimensional) direct/gradient-based inversion. For example, one embodiment may perform a 1.5-D stochastic inversion at each receiver location for a CSEM survey to derive probability distributions for the resistivity at a set of depths below the receiver. The 1.5-D inversion is an inversion based on the assumption that the model is a 1-D model (e.g., a layer-cake), and recognizes that the data have been acquired over a 3-D subsurface region. These 1-D models may then be combined according to known laws of probability to create a 3-D model that can be used as the starting model for a 3-D gradient-based inversion.

Formation of the initial or starting model for a higher dimension from the lower dimension models in this manner has several advantages over prior techniques. For example, if stochastic inversion is used to populate the starting model, then the direct 3-D inversion is more likely to begin near a global minimum and eventually converge to a model that accurately represents the subsurface region. Furthermore, formation of the initial model in this manner is more computationally feasible, whereas stochastic inversion in 3-D is computationally expensive and is currently beyond practical computational capabilities.

A variety of stochastic inversion methods can be used in forming the initial or starting model. For example, some types of stochastic inversion methods include, but are not limited to, Monte-Carlo, Markov-Chain Monte-Carlo, genetic algorithms, simulated annealing, and neural networks. One specific example of a stochastic inversion method that can be employed is the Markov-Chain Monte-Carlo method, which can sample the model space relatively efficiently, giving it the ability to determine the global minimum. In addition, a hybrid stochastic method may be used as well. This type of inversion method involves a deterministic inversion method that is paired with the stochastic method (e.g., stochastic algorithm). Nonlimiting examples of deterministic methods include the Levenberg-Marquardt minimization algorithm, Occam inversion, nonlinear conjugate gradients, and quasi-Newton methods, which are known to one skilled in the art of inversion. For more information on Occam inversion, see S. Constable, R. Parker, and C. Constable, "Occam's Inversion: A practical Algorithm for Generating Smooth Models From Electromagnetic Sounding Data," Geophysics, Vol. 52, No. 3, pp. 289-

300 (March, 1987); C. deGroot-Hedlin and Constable, "Occam's Inversion to Generate Smooth, Two-Dimensional Models from Magnetotelluric Data," Geophysics, Vol. 55, No. 12, pp. 1613-1624 (December, 1990).

Figure 2A:
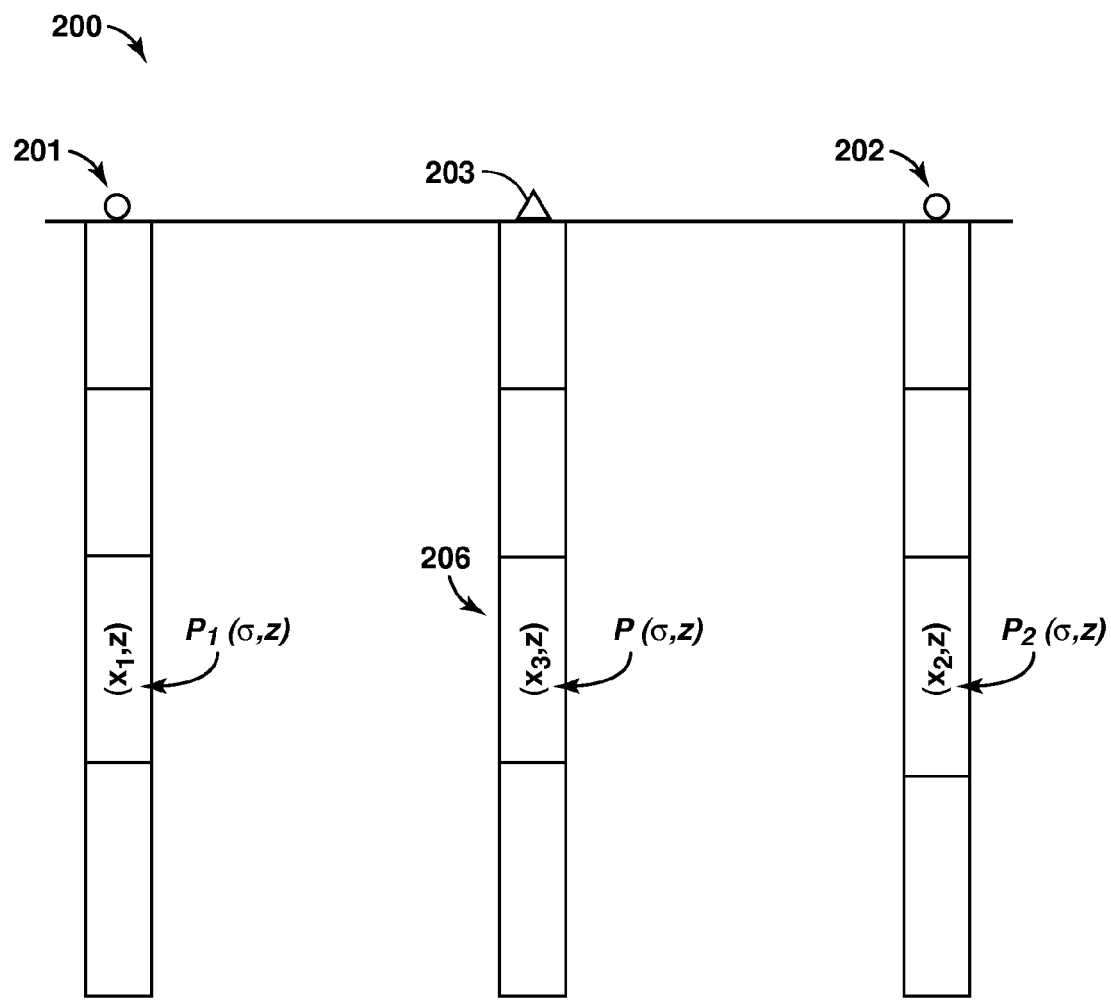
FIGS. 2A and 2B depict a side elevation view and top view of an initial model formed using 1.5-D inversions, according to an embodiment of the present techniques.
Figure 2B:
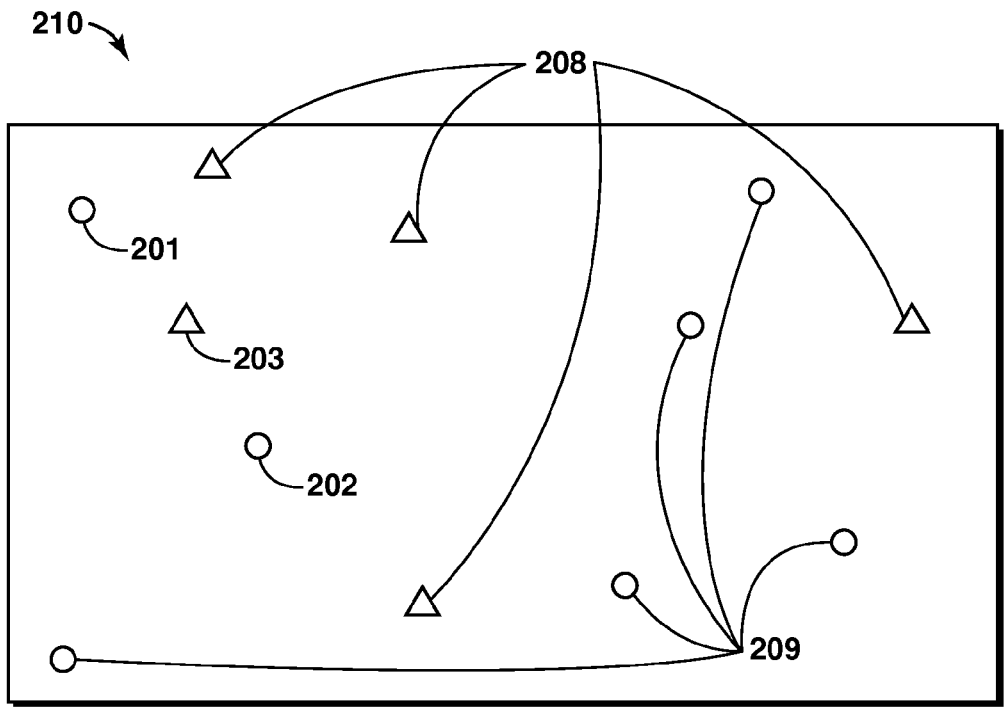

FIGS. 2A and 2B schematically depict forming an initial 3-D model 200 and using 1.5-D inversions. FIG. 2A depicts a side elevation view of the model 200 and FIG. 2B depicts a top view of the model 210. Receiver sites or locations 201 and 202 are neighboring receivers, which are indicated by circles. For this example, stochastic 1.5-D inversions are performed on the data from the receiver locations 201 and 202, yielding probability density functions (PDFs) for conductivity σ for each layer z for a set of layers describing σ(z). This assumes for this example that the conductivity in the neighborhood of each receiver can be modeled approximately by a layer-cake structure. Thus, at location 201 the probability of finding conductivity σ at depth z is given by $P_1(\sigma,z)$, while at location 202 the corresponding probability function may be denoted by $P_2(\sigma,z)$. The use of stochastic 1.5-D inversion implies that the 1-D models obtained from the inversion correspond to global minima, and yields more information about the local conductivity, namely the PDF of conductivity as a function of depth.

Using the 1-D models, the 3-D space between the receiver locations can be initialized, thus providing a higher-dimensional model (e.g., the 3-D model for this example) that serves as an initial model for a 3-D gradient-based inversion, which may avoid local minima. As shown in FIGS. 2A and 2B, the 1-D models for receivers 201 and 202 (which include the depths at the locations beneath 201 and 202, respectively) are combined to create additional 1-D models (e.g. about location 203), which are used to form the initial 3-D model. That is, embodiments combine the probability functions derived at each of the receiver locations, and use interpolation to fill the space between the receivers to generate additional models used to form the 3-D model.

FIG. 2B illustrates, in map view, an example of the spatial relationships of the receivers used for 1.5-D stochastic inversions and the interpolated locations. Locations 201, 202 and 203 from FIG. 2A are shown in one possible configuration. Additional receiver locations are denoted by locations 209. Note that physical receivers are shown as circles, while triangles indicate locations, which are labeled 208, at which the conductivity model may be created by interpolation. As shown in FIG. 2A, the space beneath each location is divided into a series of layers at prescribed depths and having prescribed thicknesses. The interpolation process is used to calculate the conductivity PDF, for each depth layer, at each grid position that is not occupied by a receiver. The final result is a 3-D grid of conductivity.

Figure 2C:
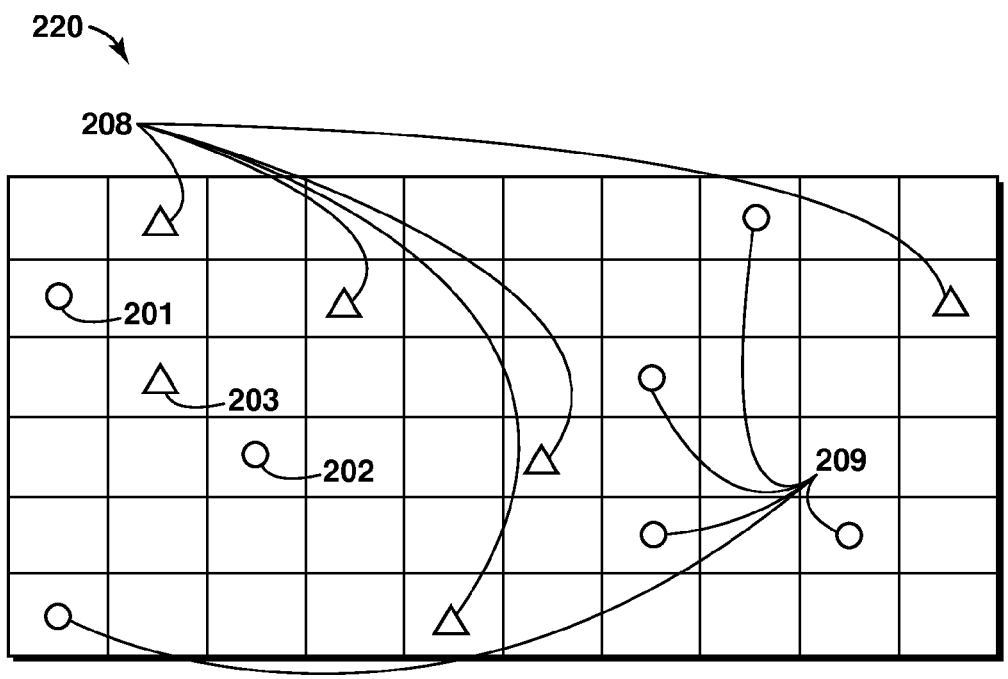
FIG. 2C depicts a layout of an example grid that may be used for a 3-D model.

FIG. 2C is an exemplary layout of a grid 220 that may be used for the 3-D model. As noted in the grid 220, the various receiver locations 201, 202 and 209 are indicated by circles, while the interpolated locations 203 and 208 are indicated by triangles. For a 3-D model, each grid location that does not include a receiver location may include a triangle and be interpolated or certain locations may be interpolated.

One particular type of interpolation that may be used is linear interpolation. Note that other types of interpolation may be used as well, such as spline, higher-order polynomial (e.g., quadratic or others), Voronoi/Delauney kriging, co-kriging, colocated co-kriging, and other methods that are known to those skilled in the art. For example, assume that the stochastic inversion process provides the Probability Density Function (PDF) for conductivity σ at horizontal location x (i.e. at a receiver location) and depth z, which is expressed as $P(\sigma(x,z))$. The PDF for an intermediate location between 1.5-D inversions, e.g. at location 203 in FIGS. 2A, 2B, and 2C, can be obtained by combining two independent probability distributions, for example $P_1(\sigma,z)$ and $P_2(\sigma,z)$, to obtain $P(\sigma,z)$, at depth z and horizontal location x, shown as 206 in FIG. 2A. The theory of probability states that the PDF for the sum of two independently distributed variables u and v, each of which has a known PDF, say $P_1(u)$ and $P_2(v)$, is given by the convolution of the individual probability distributions, as in Equation (2):

$$P(s=u+v)=\int dt P_1(t) P_2(s-t). \quad (2)$$

This equation may be used to calculate the PDF for conductivity at a location between two receiver locations, if a linear relationship is used to interpolate conductivity at the location. This procedure is outlined in the following paragraphs.

From FIG. 2A, stochastic inversions at locations $x=x_1$ and $x=x_2$ are performed to obtain the PDFs at receiver locations 201 and 202, which respectively are represented by equations (3) and (4):

$$P(\sigma_1)=P(\sigma(x_1,z)) \quad (3)$$

and $$P(\sigma_2)=P(\sigma(x_2,z)) \quad (4)$$

Using linear interpolation between inversion locations determines a likely conductivity as a function of depth, z, at the intermediate location 203 such that $\sigma_0$ is represented by equation (5):

$$\sigma_0 \equiv \sigma(x_0) = \alpha \sigma(x_1) + \beta \sigma(x_2). \quad (5)$$

where α and β are linear interpolation coefficients (normally β=1−α).

Using equations (2) and (5), $P(\sigma(x_0,z))$ can be determined from equation (6):

$$P(\sigma_0) = \frac{1}{\beta} \int du P_1(u) P_2\left(\frac{\sigma_0 - \alpha u}{\beta}\right). \quad (6)$$

This determination accounts for the probability distributions of the conductivity at the two receiver locations, 201 and 202. The convolution integral of equation (6) may be computed numerically by using a Fast Fourier Transform (FFT) of the probability distribution. If the individual PDFs have simple analytic approximations, then the integral may be computed analytically. For example, if both PDFs are given by Gaussian distributions, then the resulting PDF is Gaussian with mean equal to the mode. That is, the analytic approximation may be expressed by equation (7):

$$\text{mean}=\text{mode}=\alpha^* \text{Mean}[\sigma_1]+\beta^* \text{Mean}[\sigma_2] \quad (7)$$

Here, α and β are interpolation coefficients, generally both lying between 0 and 1, with β=1−α, which depend upon the position of location 203 with respect to locations 201 and 202.

Figure 3:
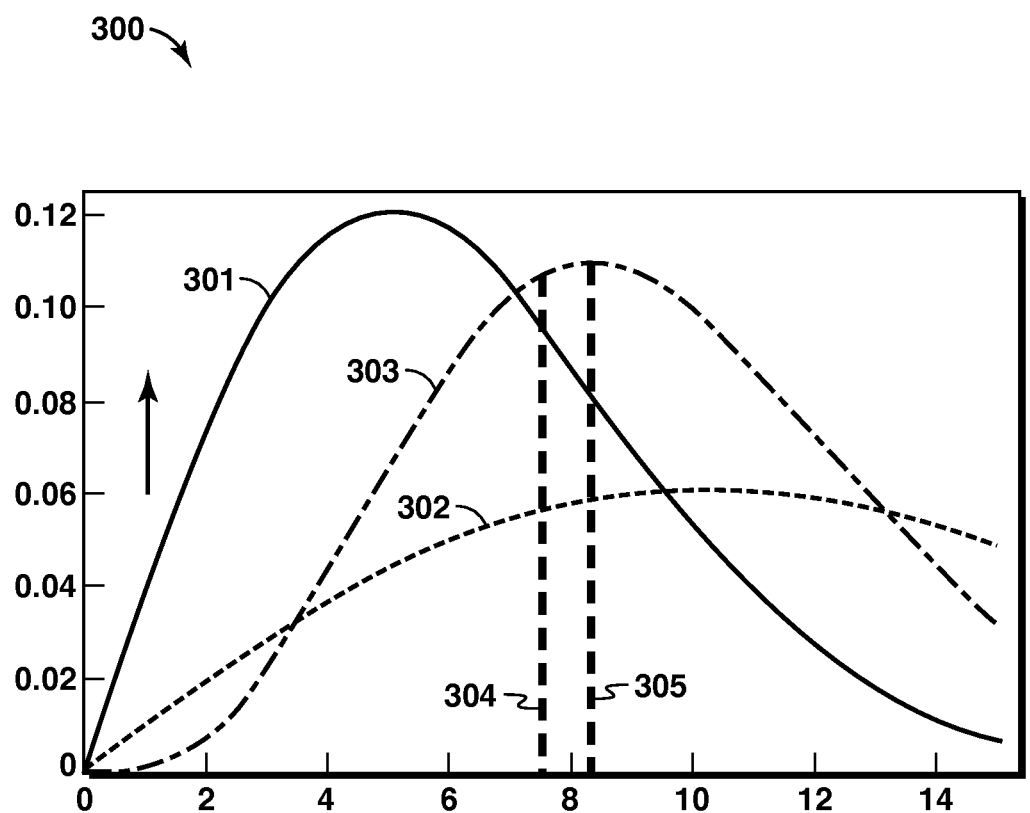
FIG. 3 depicts an example of the mode of an interpolation of two Rayleigh distributions, according to an embodiment of the present techniques.

However, for general PDFs, statistics such as the mode and median computed based on the probability distribution $P(\sigma_0)$ differ from the interpolated values of the modes and medians of the two separate distributions. That is, one can not simply interpolate the most likely conductivities determined for a certain depth and use that value as the conductivity at the intermediate horizontal location and depth. For example, as shown in FIG. 3, the mode of an interpolation of two Rayleigh distributions based on equation (6) can be different from the value obtained by simply interpolating the modes of the individual distributions. The Rayleigh probability distribution function is given by equation (8):

$$P(\sigma) = \sigma \exp[-\sigma^2/2\mu^2]/\mu^2, \tag{8}$$

where the mode of the distribution is equal to $\mu$, and, as before, $\sigma$ is conductivity.

The Rayleigh probability distribution 301 has a mode equal to five, and the Rayleigh probability distribution 302 has a mode equal to ten. The combined probability distribution 303 is a combination of the Rayleigh probability distributions 301 and 302. That is, the probability distribution 303 is a weighted sum of probability distributions 301 and 302, in this example with weights of 0.5 for each distribution. Note that the mode of the combined probability distribution 303, which is not a Rayleigh distribution, is not equal to the simple average of the modes of the two Rayleigh probability distributions 301 and 302 (e.g., the simple weighted average is given by 0.5*(5)+0.5*(10)=7.5), which is represented by the dashed line 304 at 7.5. Instead, the mode of the probability distribution 303 is equal to the mode of the distribution obtained by combining probability distributions 301 and 302 with weights equal to 0.5, which is represented by the dashed line 305 at approximately 8.2, which is calculated using equation (6). This example demonstrates that the results of the stochastic inversions must be interpolated in a manner that correctly accounts for the probability distributions of the inversion results.

For locations not surrounded by receiver sites where stochastic inversion has been performed, extrapolation of the PDFs may be necessary. This may be accomplished in a number of ways, including, but not limited to, extrapolation of the edge values by continuation of the functional form used for interpolation, simple replication of the edge values, and tapering the edge values to match an assumed background model.

Figure 4A:
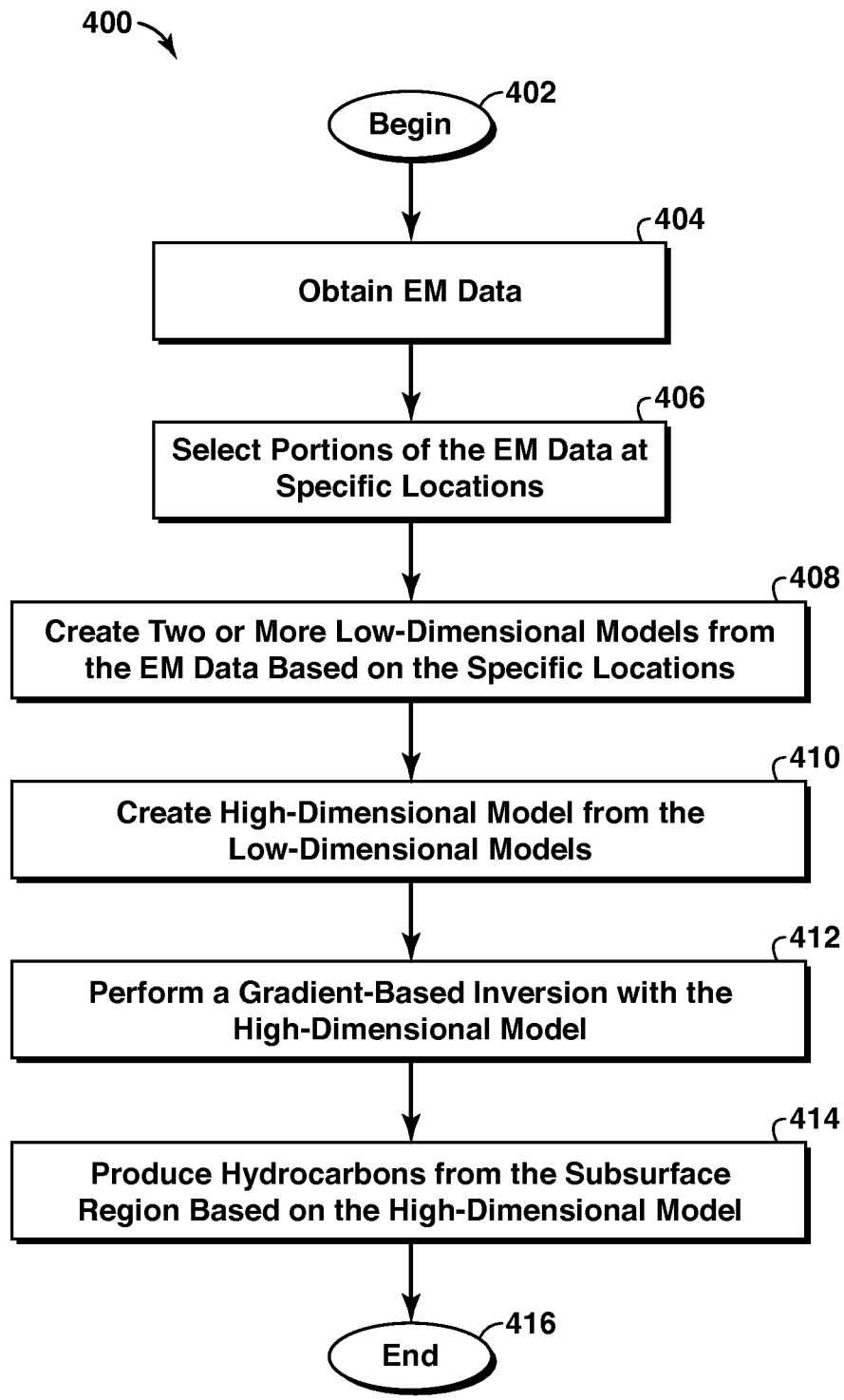
FIGS. 4A and 4B depicts flow diagrams in which stochastic inversions performed on lower-dimensional models are interpolated to form a higher-dimensional model for a gradient-based inversion, according to embodiments of the present techniques.
Figure 4B:
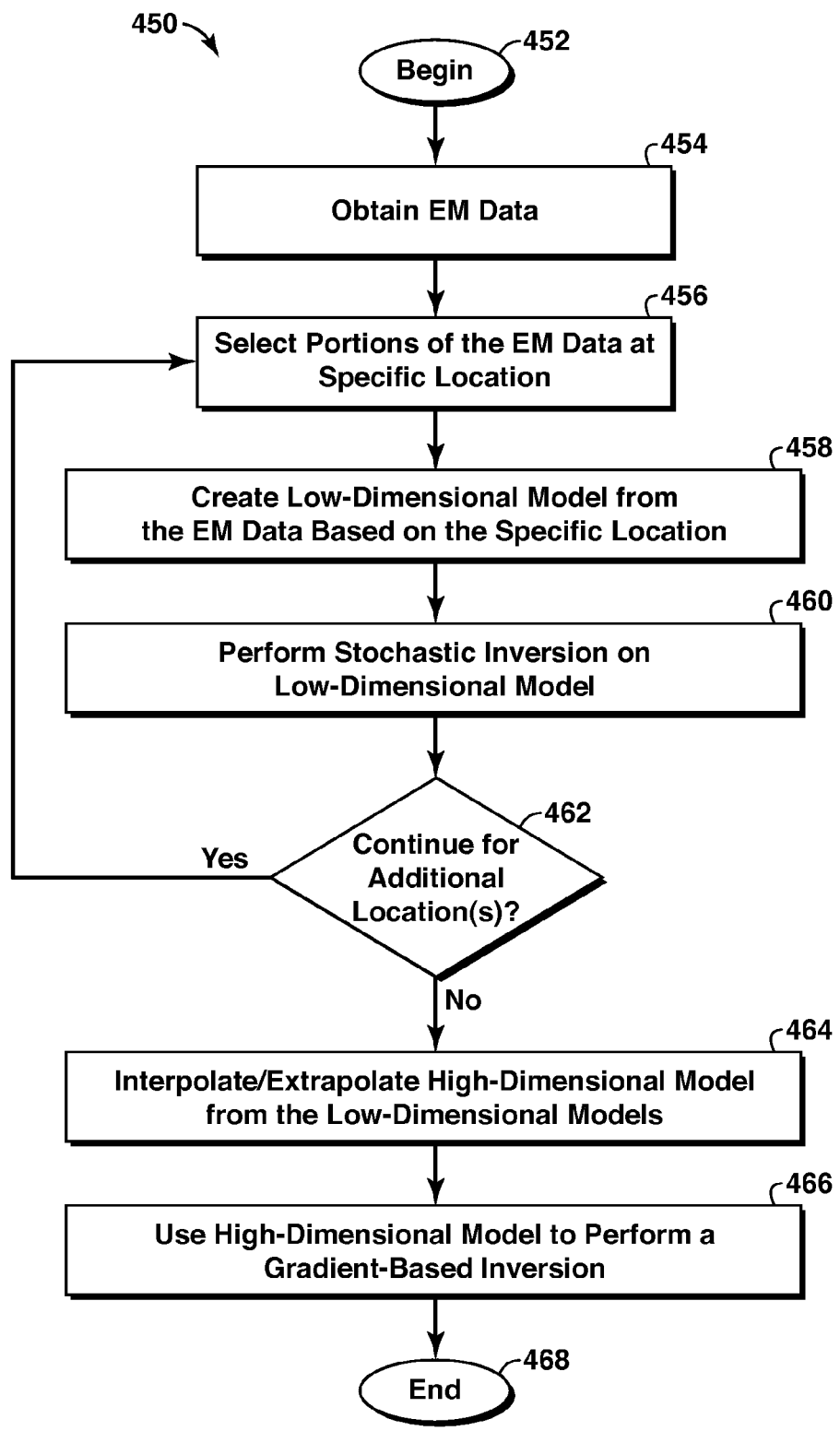

The flow charts in FIGS. 4A and 4B illustrate the steps by which the present techniques may be applied to create an initial model and a higher-dimensional model, which may be used to produce hydrocarbons or specifically for 3D geophysical inversion. In FIG. 4A, the flow chart illustrates a process 400 that provides an enhanced conductivity model that may be used to predict and recover resources, such as hydrocarbons, from subsurface regions. To begin, the process starts at block 402. At block 404, measured geophysical data is obtained at one or more locations. The geophysical data may include different types of data, such as seismic data, well data, property trends, production data, electromagnetic data, resistivity data, and conductivity data. As an example, the geophysical data may include electromagnetic (EM) data that may be obtained by a CSEM survey, by a magnetotelluric survey, by a time-domain electromagnetic survey, or by any other appropriate survey method that allows for the inversion of conductivity in the earth. Then, a portion of the geophysical data may be selected at block 406. For example, the portion of data may be selected by choosing two or more receiver locations from a CSEM survey, such that the receiver locations surround the region for which 3-D inversion may be performed. Alternatively, each of the receiver locations may be selected from the survey. From the specific locations associated with the selected portion of the EM data, a low-dimensional model may be created, as shown in block 408. For example, one may perform 1.5-D inversions at each receiver location. These low-dimensional models may be generated from stochastic inversion, as described above.

Once the low-dimensional models are created, they are combined to construct a high-dimensional model, as shown in block 410. As an example of this step, FIGS. 2A, 2B and 2C and the associated discussion illustrate the process of combining multiple 1-D models to initialize a 3-D gradient-based inversion. At block 412, a gradient-based inversion may be performed using the high-dimensional model. As mentioned above, with present computing capability 3-D inversions typically involve the use of deterministic, usually gradient-based, inversion algorithms, which, while having reasonable compute times, can become trapped in a local minimum. By initializing the inversion with a model created in block 410, which is based upon lower-dimensional stochastic inversions, the higher-dimensional model may avoid starting near a local minimum and thereby converge to a model associated with a global minimum. Finally, at block 414, the high-dimensional model may be used to produce hydrocarbons from the subsurface region.

Furthermore, a specific exemplary flow chart is shown in FIG. 4B. Similar to the discussion above, FIG. 4B is a flow chart illustrating a process 450 to provide an enhanced model that may be used to predict and recover resources, such as hydrocarbons, from subsurface regions. To begin, the process starts at block 452. The measured EM data may be obtained at a plurality of locations in block 454, similar to the discussion of block 402 above. In block 456, portions of the EM data may be selected from a specific location, similar to the discussion above of block 406. At block 458, a low-dimensional model is developed based on the EM data. Note that other data such as seismic data may also be used to form the model. The model may involve dividing the subsurface region below the location into a set of layers of given thicknesses, depths, and initial conductivities. That is, the model may be parameterized. Note that this is considered a starting model because the stochastic inversion techniques or algorithms are designed to explore a large range of conductivities, which are independent of the initial values.

Once the low-dimensional model is formed, a stochastic inversion is performed on the model, as shown in block 460. One of a number of possible stochastic 1.5-D inversion algorithms may be selected with which to invert the EM data in the low-dimensional model, some of these being, but not limited to, simple Monte-Carlo, simulated annealing, Markov-Chain Monte-Carlo, or genetic algorithms. The result of performing the stochastic inversion algorithm is a set of probability density functions (PDFs), one for each layer designated in the low-dimensional model. For instance, if the low-dimensional model is of conductivity, the inversion may result in a model of the conductivity structure beneath the specific location. Then, a determination is made whether models are to be generated for additional locations, as shown in block 462. If additional models are to be constructed, then the process repeats to block 456. If no additional models are to be constructed, then the low-dimensional models are used to interpolate/extrapolate into a higher-dimensional space, as shown in block 464. For instance, additional PDFs are generated by using interpolation and/or extrapolation of the PDFs to populate the entire 2-D or 3-D space encompassed by the data locations. In this way, a starting or initial conductivity model for 2-D or 3-D inversion is built from 1-D component models that are biased towards a global minimum, not a local minimum, in the conductivity parameter space. Then, at block 466, the high-dimensional model may be used to initialize a gradient-based inversion. For example, the interpolated/extrapolated high-dimensional model of block 464 may result in a 3-D model, which is used in block 466 as the starting point of a 3-D non-linear conjugate-gradient inversion for conductivity in the 3-D space. The conjugate-gradient inversion is computationally feasible in 3-D, while stochastic inversion is not; it is not possible to compute sufficient forward modeling steps to adequately explore the conductivity model space. However, the stochastic-based initial model will help steer the gradient-based inversion toward the correct model.

Figure 5:
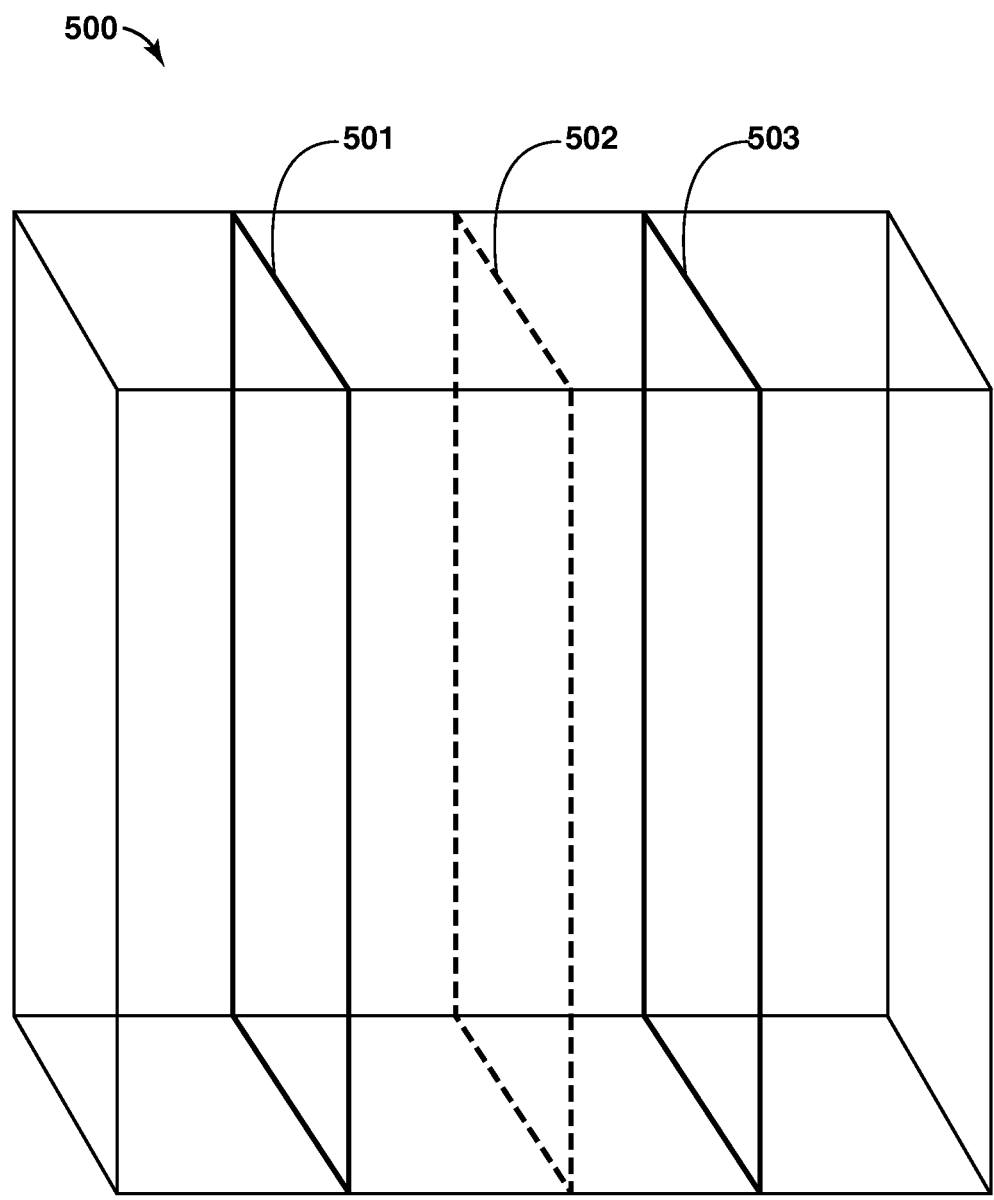
FIGS. 5 and 6 show a side elevation view and top view of an initial model formed using 2-D inversions, according to an embodiment of the present techniques.
Figure 6:
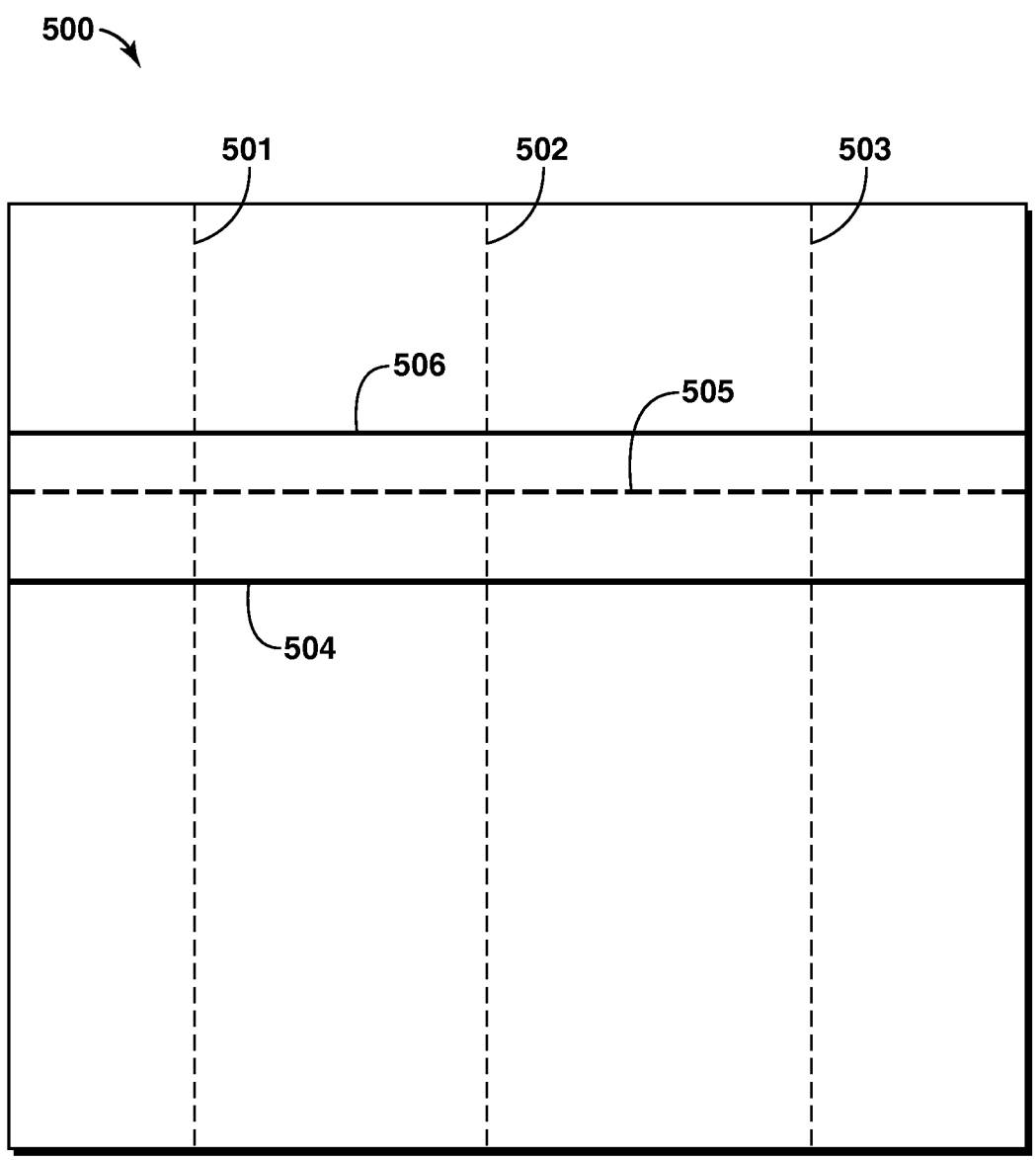

Similar to the 1.5-D to 2-D (or 3-D) case described above, embodiments can use multiple stochastic 2.5-D inversions to initialize a 3-D model to be used in a gradient-based inversion. For example, FIGS. 5 and 6 schematically depict forming an initial model 500 using 2.5-D inversions. FIG. 5 depicts a side elevation view of the model and FIG. 6 depicts a top view of the model 500. 2.5-D inversions 501 and 503 may be formed with data from one or more receiver sites to yield a PDF for the conductivity in the x and z dimensions. The use of the stochastic inversions avoids forming 2-D models that correspond to a local minimum. Using the 2-D models, the 3-D space between the 2-D models can be initialized, thus providing a 3-D model that serves as an initial model for a 3-D gradient-based inversion, which may avoid local minima. For example, 2.5-D inversions 501 and 503 may be interpolated to yield a conductivity model on plane 502, and inversions on planes 504 and 506 may be interpolated to initialize the conductivity on plane 505. The 2-D models may be combined as described above, using bilinear interpolation or other alternatives.

In this alternate embodiment, data from locations that lie approximately on a linear path on the surface of the earth may be selected and inverted together using a 2.5-D stochastic algorithm of any of the same types as listed above. For this example, the parameterization of the earth model may be more general than a layer cake model. For instance, it may include a series of curves bounding layers in the 2-D plane beneath the line on which the data are located. A number of points on the curves may be used to parameterize the conductivity at their locations, with any of a number of interpolation methods being used to obtain the conductivity at other points on the plane. If other lines of data locations are available, 2.5-D inversion may be repeated for each of the lines, before the 2-D models are combined to form a 3-D initial model.

Additionally, 2.5-D inversions, such as inversions 501 and 503, need not be parallel to each other. Moreover, 2.5D inversions, such as inversions 501 and 503, may be regarded as collections of 1.5-D inversions from different receiver locations, such as receiver location 202 and combined with other 1.5-D inversions from receiver location 201.

After determination of the initial model, the gradient-based inversion process is performed as described above. By preparing the 3-D initial model as described herein (i.e. by properly combining the results of 1.5-D or 2.5-D stochastic inversions to populate the initial model) the gradient-based inversion may begin in the neighborhood of the global minimum. Therefore, convergence to an incorrect local minimum may be avoided.

In general, CSEM data is useful for determining whether a subsurface region contains valuable materials, e.g. hydrocarbons, such as oil or gas. While CSEM data in general is low resolution because of the low frequency of the transmitting signal, CSEM data can be used in combination with other data, e.g. seismic data, to determine whether the region of interest should be pursued. The embodiments described herein may be used to create an initial model for any inversion method for which a stochastic formulation is valid. For example, it could be used for CSEM inversion, seismic inversion, or joint seismic/CSEM inversion. Thus, embodiments described herein transform data from measurements of characteristics of physical portions of a physical object, e.g. the earth, into models of the physical objects, including internal features of the object, e.g. oil and gas deposits.

Note that any of the functions described herein may be implemented in hardware, software, and/or firmware, and/or any combination thereof. When implemented in software, the elements of the present techniques are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Figure 7:
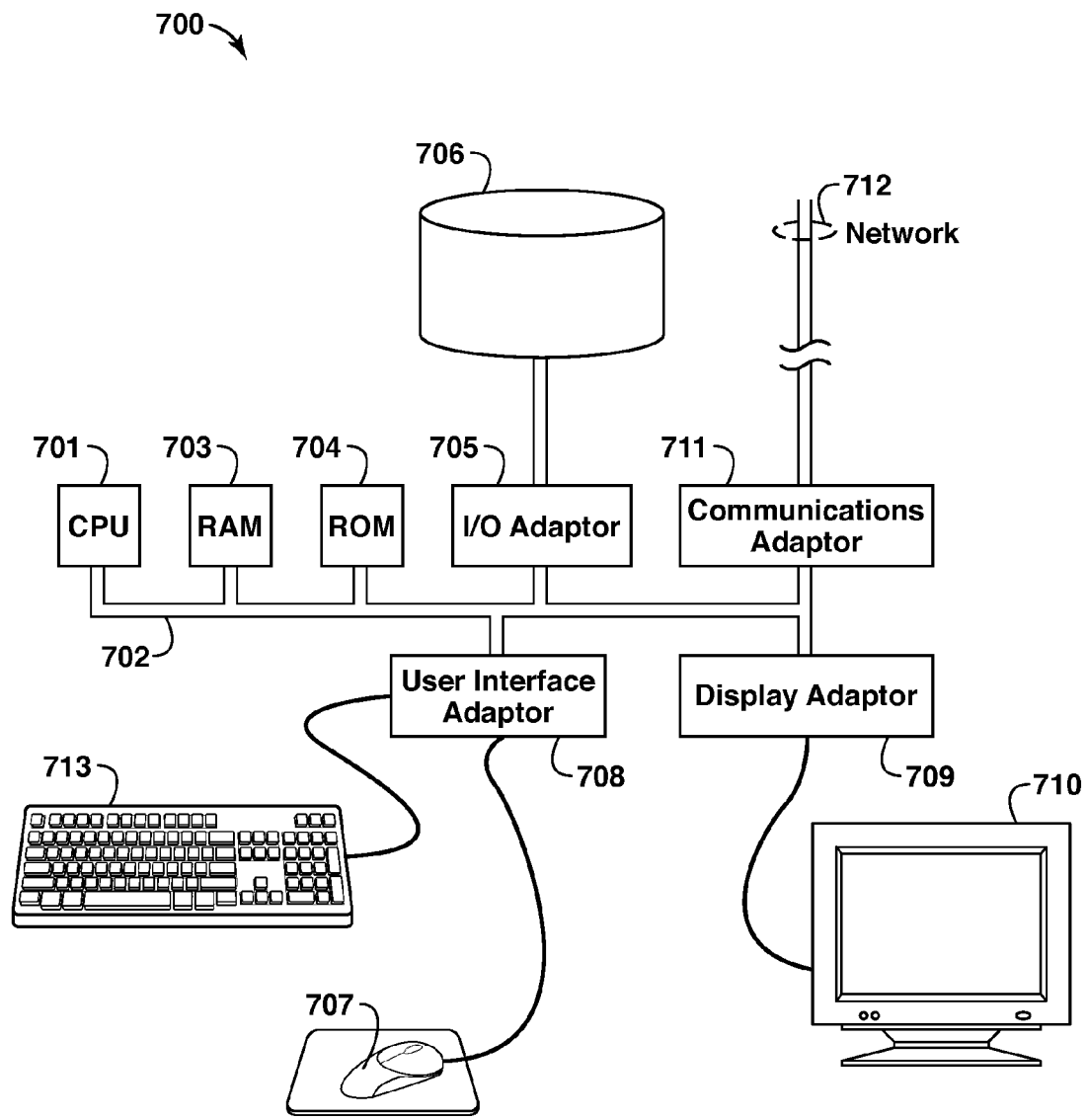
FIG. 7 depicts a block diagram of a computer system that is adapted to use the present techniques.

FIG. 7 illustrates computer system 700 adapted to use the present techniques. Central processing unit (CPU) 701 is coupled to system bus 702. The CPU 701 may be any general purpose CPU, such as an Intel Pentium processor. However, the present techniques is not restricted by the architecture of CPU 701 as long as CPU 701 supports the inventive operations as described herein. For example, the CPU may perform the stochastic inversions on the lower-dimensional models, and the gradient inversions on the higher-dimensional models. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects to storage devices 706, such as one or more of a hard drive, a CD drive, a floppy disk drive, a tape drive, to the computer system. The storage device 706 holds the EM data from the receivers. The I/O adapter 705 is also connected to printer (not shown), which allow the system to print paper copies of information such as document, photographs, articles, etc. Note that the printer may be a printer (e.g. inkjet, laser, etc.), a fax machine, or a copier machine. Thus, the system 700 can print a graphical version of an initial model to a user. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, and microphone (not shown), to the computer system 700. User interface card 708 also provides sound output to a user via speaker(s) (not shown). The display card 709 is driven by CPU 701 to control the display on display device 710. Thus, the system 700 displays a graphical version of an initial model to a user, and may display a final model to a user.

As discussed above, information obtained concerning the physical properties of a physical system may be communicated to the computing system 700 by any storage medium, including, but not limited to, recording tape, magnetic disks, compact disks, and DVDs. The information obtained concerning the physical properties may also be communicated directly to the computing system 700 by, e.g., a satellite link (not shown), and stored in RAM 703. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms constructing," "performing," "calculating," "determining," "displaying," and the like.

Note also that the software implemented aspects of the present techniques are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The present techniques is not limited by these aspects of any given implementation.

It should be appreciated that the blocks in FIGS. 4A and 4B may be implemented as modules of hardware components or a set of instructions stored in memory (e.g., RAM 703 and ROM 704) of a computer system 700 and when executed by a processor (e.g., CPU 701) perform the various functionality described above. For instance, a selection module may be used to interact with a user to select the portions of the geophysical data at specific locations. A low-dimensional modeling module may be utilized to create the low-dimensional models from the geophysical data at the specific locations. Also, a high-dimensional model module may be used to create the high-dimensional model from the low-dimensional models. In addition, a gradient-based inversion module may be used to perform the gradient-based inversion of the high-dimensional model and interact with a display module that displays the representation of the subsurface region on the display device 710, which may be a monitor.

Although the present techniques and its advantages have been described in detail, it should be understood that various changes, substitutions and alterations can be made herein without departing from the spirit and scope of the present techniques as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present techniques, processes, machines, manufacture, compositions of matter, means, methods, or steps, presently existing or later to be developed that perform substantially the same function or achieve substantially the same result as the corresponding embodiments described herein may be utilized according to the present techniques. Accordingly, the appended claims are intended to include within their scope such processes, machines, manufacture, compositions of matter, means, methods, or steps.

What is claimed is:

1. A hydrocarbon prospecting method for forming an N-dimensional model of a physical property for a subsurface region comprising:
   obtaining geophysical survey data from a subsurface region, wherein the data are sensitive to a physical property;
   constructing an initial model of the physical property in the subsurface region by performing a less than N-dimensional stochastic inversion of the data;
   performing, using a computer, an N-dimensional deterministic inversion of the data using the initial model as a starting model, thereby forming the N-dimensional model of the subsurface region, said N-dimensional model including hydrocarbon deposits;
   using the N-dimensional model to generate, with a computer, an image of the subsurface region for exploration of hydrocarbons; and
   exploring for hydrocarbons using the image of the subsurface region.

2. The method of claim 1, wherein the stochastic inversion is selected from the group consisting of:
   Markov-Chain Monte-Carlo, Monte-Carlo, genetic, simulated annealing, and neural network.

3. The method of claim 1, wherein the stochastic inversion is a hybrid stochastic/deterministic inversion, and the stochastic portion is selected from the group consisting of:
   Markov-Chain Monte-Carlo, Monte-Carlo, genetic, simulated annealing, and neural network; and
   the deterministic portion is selected from the group consisting of:
   Levenberg-Marquardt minimization, Occam, nonlinear conjugate gradient, and quasi-Newton.

4. The method of claim 1, wherein the deterministic inversion is a gradient-based inversion.

5. The method of claim 1, wherein the N is equal to three.

6. The method of claim 1, wherein constructing an initial model comprises constructing at least two models by less than N-dimensional stochastic inversions, each of the at least two models associated with a different survey receiver location, and then interpolating the at least two models to form the initial model of the physical property in the subsurface region.

7. The method of claim 1, wherein the data comprise a plurality of points, and the constructing comprises:
   performing the stochastic inversion on each point of the plurality of points to form a plurality of inversions;
   predicting additional inversions from the stochastic inversions; and
   combining the additional inversions and the plurality of stochastic inversions to form the initial model, wherein the initial model has a higher dimension than the stochastic inversions.

8. The method of claim 7, wherein the initial model has N dimensions.

9. The method of claim 7, wherein predicting comprises:
   interpolating additional inversions between the stochastic inversions; and
   extrapolating additional inversions between a stochastic inversion of the plurality of stochastic inversions and a boundary of the initial model.

10. The method of claim 9, wherein the interpolating comprises one of the following interpolations selected from the group consisting of:

linear, spline, higher-order polynomial, quadratic, Voronoi/Delauney kriging, co-kriging, and co-located co-kriging.

11. The method of claim 9, wherein the extrapolating comprises one of the following extrapolations selected from the group consisting of:
edge value continuation, edge value replication, and edge value tapering.

12. The method of claim 1, wherein the N-dimensional gradient based inversion is selected from the group consisting of:
least squares, simplex, steepest descent, conjugate gradient, quasi-Newton, Gauss-Newton, and full Newton.

13. The method of claim 12, wherein N is three.

14. The method of claim 1, wherein the subsurface region is one of a sedimentary basin and petroleum reservoir.

15. The method of claim 1, wherein the data comprise at least one of seismic data, well data, property trends, production data, electromagnetic data, resistivity data, and conductivity data.

16. The method of claim 1, wherein sensing comprises:
performing a controlled source electromagnetic survey of the portion of the subsurface region.

17. The method of claim 1, further comprising:
using the N-dimensional model to determine a location of a sub-surface mineral in the subsurface region.

18. A hydrocarbon prospecting method for forming a 3-dimensional model of a subsurface region comprising:
performing a controlled source electromagnetic survey of a portion of the subsurface region using a plurality of receivers located in the subsurface region to form a plurality of conductivity profile curves, with one curve associated with each receiver;
performing a plurality of less than 3-dimensional stochastic inversions on the curves, with one inversion being associated with each curve, to form a plurality of conductivity probability density functions;
forming a plurality of less than 3-dimensional conductivity models using the probability density functions, with one conductivity model being formed from one function;
predicting at least one additional conductivity model;
populating an initial 3-dimensional model of the physical region with the one additional conductivity model and the plurality of less than 3-dimensional conductivity models;
performing a 3-dimensional gradient based inversion on the initial 3-dimensional model to form the 3-dimensional model, said 3-dimensional model including hydrocarbon deposits;
using the 3-dimensional model to generate, with a computer, an image of the subsurface region exploration of hydrocarbons; and
exploring for hydrocarbons using the image of the subsurface region.

19. The method of claim 18, wherein the predicting comprises at least one of:
interpolating the additional conductivity model between at least two conductivity models of plurality of less than 3-dimensional conductivity models; and
extrapolating the additional conductivity model between one conductivity model of the plurality of less than 3-dimensional conductivity models and a boundary of the initial model.

20. The method of claim 18, wherein the subsurface region is one of a sedimentary basin and petroleum reservoir.

21. The method of claim 18, wherein populating the initial 3-dimensional model comprises:
adding at least one additional feature to the initial 3-dimensional model derived from data from another source;
wherein the another source is selected from the group consisting of:
seismic data, well data, property trends, and production data.

22. The method of claim 18, further comprising:
using the 3-dimensional model to determine a location of a mineral in the subsurface region.

23. A method for predicting a location of hydrocarbons from a subsurface region of the earth for production of the hydrocarbons, comprising:
a. obtaining geophysical data associated with a subsurface region;
b. selecting a portion of the geophysical data corresponding to at least two receiver locations, wherein the geophysical data are sensitive to one or more physical properties of the subsurface region;
c. creating a low-dimensional model at each of the at least two receiver locations, wherein each low-dimensional model is created by performing a stochastic inversion of the geophysical data at each of the at least two receiver locations;
d. creating a high-dimensional model by deterministic inversion of the geophysical data using the low-dimensional models to develop a starting model, wherein the dimensionality of the high-dimensional model is greater than the dimensionality of the low-dimensional models, wherein the high-dimensional model includes hydrocarbon deposits;
wherein the stochastic inversion and the deterministic inversion are performed using a computer;
e. using the high-dimensional model to generate, with a computer, an image of subsurface region for exploration of hydrocarbons; and
f. exploring for hydrocarbons using the image of the subsurface region.

24. The method of claim 23, comprising performing a gradient-based inversion with the high-dimensional model.

25. The method of claim 24, wherein the gradient-based inversion is one of a least squares inversion, simplex inversion, steepest descent inversion, conjugate gradient inversion, quasi-Newton inversion, Gauss-Newton inversion, and full Newton inversion.

26. The method of claim 23, comprising:
drilling a well to access the hydrocarbons at the predicted hydrocarbon location; and
producing the hydrocarbons from the predicted hydrocarbon location.

27. The method of claim 23, wherein at least one of the low-dimensional models is a 1-D model of conductivity variation or a 2-D model of conductivity variation.

28. The method of claim 23, wherein the stochastic inversion is a hybrid stochastic/deterministic inversion, wherein the stochastic inversion portion of the hybrid stochastic/deterministic inversion is one of a Markov-Chain Monte-Carlo inversion, Monte-Carlo inversion, genetic inversion, simulated annealing inversion, and neural network inversion, and wherein the deterministic portion of the hybrid stochastic/deterministic inversion is one of a Levenberg-Marquardt minimization inversion, Occam inversion, nonlinear conjugate gradient inversion, and quasi-Newton inversion.

29. The method of claim 23, wherein creating a low-dimensional model comprises interpolating additional low-dimensional models between the low-dimensional models at each of the at least two receiver locations, wherein the additional models are associated with surface locations not associated with a receiver.

30. The method of claim 29, wherein the interpolating comprises one of linear interpolations, spline interpolations, higher-order polynomial interpolations, quadratic interpolations, Voronoi/Delauney kriging interpolations, co-kriging interpolations, and co-located co-kriging interpolations.

31. The method of claim 23, wherein the subsurface region is one of a sedimentary basin and petroleum reservoir.

32. The method of claim 23, wherein the geophysical data comprise at least one of seismic data, well data, property trends, production data, electromagnetic data, resistivity data, and conductivity data.

33. The method of claim 23, wherein the geophysical data are obtained from a controlled source electromagnetic survey of the portion of the subsurface region.

34. A method for detecting hydrocarbons in a model of a subsurface region comprising:
   performing a controlled source electromagnetic survey of a subsurface region using a plurality of receivers located above the subsurface region to form a plurality of receiver data gathers, with one gather associated with each receiver;
   performing a plurality of stochastic inversions on each gather, with one inversion being associated with a conductivity profile curve, to form a plurality of conductivity probability density functions;
   forming a plurality of low-dimensional models using the probability density functions, with one low-dimensional model being formed from one probability density function;
   creating at least one additional low-dimensional model from one or more of the a plurality of low-dimensional models;
   forming a high-dimensional model from the at least one additional low-dimensional model and the a plurality of low-dimensional models;
   performing a gradient-based inversion with the high-dimensional model to adjust the high-dimensional model, wherein the adjusted high-dimensional model includes hydrocarbon deposits;
   using the adjusted high-dimensional model to generate, with a computer, an image of the subsurface region; and
   exploring for hydrocarbons using the image of the subsurface region.

35. The method of claim 34, wherein creating at least one additional low-dimensional model from one or more of the plurality of low-dimensional models comprises at least one of:
   interpolating the additional low-dimensional model between at least two of the plurality of low-dimensional models; and
   extrapolating the additional low-dimensional model between at least one of the plurality of low-dimensional models and a boundary of the high-dimensional model.

* * * * *